United States Patent [19]
Butts et al.

[11] Patent Number: 5,767,394
[45] Date of Patent: Jun. 16, 1998

[54] METHOD AND SYSTEM FOR EARLY CYLINDER IDENTIFICATION

[75] Inventors: Kenneth Roy Butts, Grosse Pointe Woods; Stephen William Magner, Lincoln Park; Christopher Cyril Mann, Northville, all of Mich.

[73] Assignee: Ford Global Technologies, Inc., Dearborn, Mich.

[21] Appl. No.: 797,378

[22] Filed: Feb. 7, 1997

[51] Int. Cl.$^6$ .................................. G01M 15/00
[52] U.S. Cl. .................................. 73/116; 701/101
[58] Field of Search .................. 73/116, 117.2, 73/117.3; 123/419, 436; 364/431.07, 431.08, 431.03

[56] References Cited

U.S. PATENT DOCUMENTS

| | | | |
|---|---|---|---|
| 3,992,930 | 11/1976 | Back et al. | 73/117.3 |
| 4,043,189 | 8/1977 | Tedeschi | 73/117.3 |
| 4,338,903 | 7/1982 | Bolinger | 123/476 |
| 4,378,004 | 3/1983 | Petrie | 123/643 |
| 4,924,830 | 5/1990 | Abe | 123/414 |
| 5,070,726 | 12/1991 | Fukui et al. | 73/116 |
| 5,070,727 | 12/1991 | Davis et al. | 73/116 |
| 5,079,945 | 1/1992 | Hansen et al. | 73/116 |
| 5,182,943 | 2/1993 | Fukui et al. | 73/116 |
| 5,245,968 | 9/1993 | Kolias et al. | 123/414 |
| 5,433,108 | 7/1995 | Sawada | 73/117.3 |
| 5,460,134 | 10/1995 | Ott et al. | 123/476 |
| 5,493,496 | 2/1996 | James et al. | 364/431.04 |
| 5,570,016 | 10/1996 | Schroeder et al. | 324/207.25 |

Primary Examiner—George M. Dombroske
Attorney, Agent, or Firm—Peter Abolins; Roger L. May

[57] ABSTRACT

An early cylinder identification method and system using pulsewidth encoding are provided for use in a variable camshaft timing equipped engine. The method includes generating multiple signal pulses, each signal pulse having a unique length and being associated with one of the engine cylinders. The method also includes measuring the length of a signal pulse, and identifying the engine cylinder associated with the signal pulse based on the measured length of the signal pulse. A system includes a specially designed sensor wheel and control logic for performing the method.

16 Claims, 3 Drawing Sheets

METHOD AND SYSTEM FOR EARLY CYLINDER IDENTIFICATION

TECHNICAL FIELD

This invention relates to a method and system for early active identification of engine cylinders using pulsewidth encoding in a variable camshaft timing equipped engine.

BACKGROUND ART

Methods and systems for early cylinder identification (CID) offer the potential to improve and simplify cold start vehicle fueling. More specifically, start times for direct "in-cylinder" injection (DI) gasoline engines should be comparable to current port fuel injected (PFI) engines. In that regard, the time delay for injection to begin is dependent on the time to synchronize CID and crankshaft position. As a result, early CID is required for DI engines to allow sequential fuel injection (SEFI) during crank.

Such SEFI during crank also provides improved fuel control for both PFI and DI engines. In that regard, cold-start emissions can be reduced and combustion stability during crank and start-up can be improved. More specifically, cylinder-to-cylinder air-fuel ratios, cycle-to-cycle air-fuel ratios, misfires and partial burns may all be reduced.

However, early CID methods and systems have proven expensive to implement, requiring sophisticated or specially designed sensors, as well as complex software for use therewith. More cost effective methods and systems require a relatively large number of degrees of camshaft rotation for active CID, thereby diminishing the benefits of early CID. Still further, such methods and systems are not compatible with both fixed and variable camshaft timing (VCT) engine systems.

Thus, there exists a need for an improved method and system for early CID. Such a method and system would identify camshaft position (i.e., active cylinder) during engine crank using pulsewidth encoding. In this fashion, such a method and system would not only reduce the expenses associated with prior art early CID methods and systems, while also requiring fewer degrees of camshaft rotation for active CID. Still further, such a method and system would be compatible with both fixed timing and VCT engine systems.

SUMMARY OF THE INVENTION

Accordingly, the principal object of the present invention is to provide an improved method and system for early cylinder identification.

According to the present invention, then, a method is provided for early identification of a plurality of cylinders in a variable camshaft timing equipped engine. The method comprises generating a plurality of signal pulses, wherein each signal pulse has a unique length and is associated with one of the plurality of engine cylinders. The method of the present invention further comprises measuring the length of one of the plurality of signal pulses, and identifying the one of the plurality of engine cylinders associated with the one of the plurality of signal pulses based on the measured length of the one of the plurality of signal pulses.

A system is also provided for early identification of a plurality of cylinders in a variable camshaft timing equipped engine. The system comprises a signal generator for generating a plurality of signal pulses, wherein each signal pulse has a unique length and is associated with one of the plurality of engine cylinders. The system of the present invention further comprises a measurement system for measuring the length of one of the plurality of signal pulses, and a cylinder identifier for identifying the one of the plurality of engine cylinders associated with the one of the plurality of signal pulses based on the measured length of the one of the plurality of signal pulses.

These and other objects, features and advantages will be readily apparent upon consideration of the following detailed description in conjunction with the accompanying drawings.

BRIEF DESCRIPTION OF THE DRAWINGS

FIG. 4 is a flowchart depicting another portion of the method of the present invention concerning signal pulse trailing edge detection and cylinder identification.

DETAILED DESCRIPTION OF THE INVENTION

In general, the present invention provides a method and system for early CID using pulsewidth encoding. In such a fashion, the method and system of the present invention require fewer degrees of camshaft rotation for active CID, and are compatible with both fixed timing and VCT engine systems.

The advantages of high camshaft, those measurement resolution (i.e., at least one measurement tab per cylinder) provided in VCT engines are discussed in U.S. patent application Ser. No. 08/784,882, which is hereby incorporated by reference, entitled "Method And System For Time Based Decoding of VCT/CID Sensor Wheel", filed on Jan. 16, 1997, and assigned to the assignee of the present application. Moreover, as VCT equipped engines present the more challenging implementation, the present invention will be described in conjunction with VCT measurement.

With reference to FIGS. 1–4, the preferred embodiment of the method and system of the present invention will now be described more specifically. As is well known in the art, in VCT equipped engines, the camshaft sensor wheel serves two purposes. First, the wheel is provided with multiple tabs for VCT measurement. Second, the sensor wheel is also provided with a single tab for CID, which allows the ignition and fuel systems to operate.

In such prior art single sensor wheel VCT/CID systems, VCT tabs are distinguished from the CID tab in one of two ways. The first method is appropriate for an in-line 4-cylinder engine, and the second is appropriate for a 6 or 8-cylinder engine.

Figure 1A:
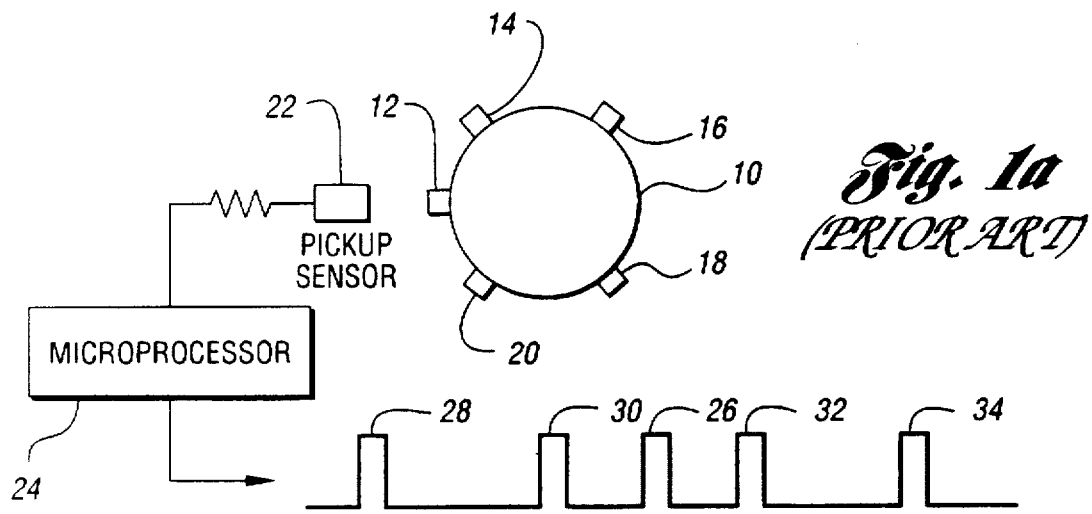
FIG. 1a is a prior art VCT/CID sensor wheel for use in a 4-cylinder engine.

Referring now to FIG. 1a, a prior art VCT/CID sensor wheel for use in a 4-cylinder engine is shown. As seen therein, a sensor wheel (10) is provided with a single tab (12) for CID, and four other tabs (14, 16, 18, 20) for VCT position (one for each cylinder). A pickup sensor (22) and a circuit/microprocessor (24) produce a signal pulse for each pass of CID tab (12) and a VCT tab (14, 16, 18, 20). VCT tabs (14, 16, 18, 20) are spaced equidistant from each other, and CID tab (12) is equidistant between two VCT tabs (14, 20).

Figure 1B:
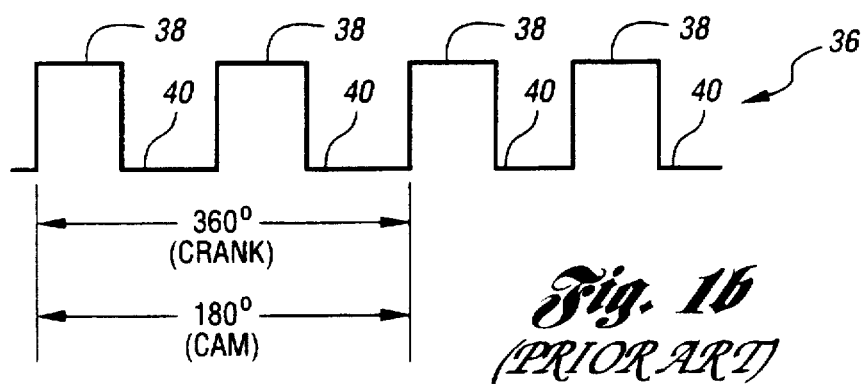
FIG. 1b is a graphical representation of a prior art VCT/CID signal pulse train produced by the VCT/CID sensor wheel of FIG. 1a in relation to a crankshaft signature signal.

Referring next to FIG. 1b, a graphical representation is shown of a VCT/CID signal pulse train produced by sensor wheel (10) in relation to a crankshaft signature signal. A signal pulse (26) produced by the CID tab is distinguished from a signal pulse (28, 30, 32, 34) produced by a VCT tab by checking whether the signal pulse in question occurs when the crankshaft electronic signature signal (36) is high or low.

More specifically, as seen in FIG. 1b, the crankshaft electronic signal (36) is high (38) (equal to one) for one-half of a combustion cycle, and low (40) (equal to zero) for the other half of the cycle. If the VCT/CID signal pulse in question occurs when the crankshaft electronic signature signal (36) is high (38), the pulse (28, 30, 32, 34) indicates a VCT tab. If the pulse occurs when the crankshaft electronic signature signal (36) is low (40), the pulse (26) indicates the CID tab.

For camshaft phasing purposes, an alternative method for distinguishing between VCT tabs and the CID tab is employed in 6 and 8-cylinder engines. More specifically, a sensor wheel is constructed having only one-half the number of VCT tabs compared to the number of cylinders of the engine. The CID tab is again placed equidistant between two VCT tabs creating a 3+1 sensor wheel for a 6-cylinder engine, and a 4+1 sensor wheel for an 8-cylinder engine. Thus, sensor wheel (10) of FIG. 1a is also appropriate for use in an 8-cylinder engine.

VCT/CID tab distinguishment operates by counting and tracking crankshaft based combustion events. A VCT tab to VCT tab sequence of events will always occur over two combustion events. In contrast, a VCT to CID tab sequence or a CID to VCT tab sequence will always occur during a single combustion event. Regardless, the last tab type must be stored to know if a CID or VCT had previously occurred.

Figure 2A:
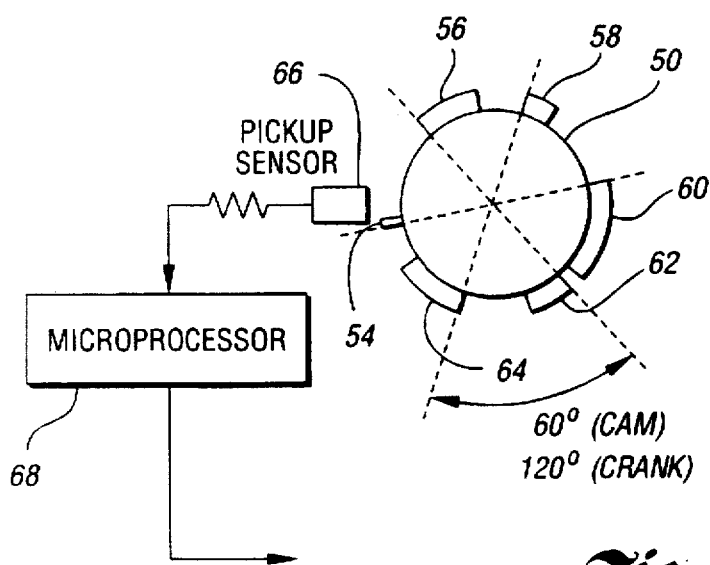
FIG. 2a is a sensor wheel for use in a 6-cylinder engine according to the method and system of the present invention.

Referring now to FIG. 2a, a sensor wheel for use in a 6-cylinder engine is shown according to the method and system of the present invention. As seen therein, sensor wheel (50) contains six tabs (54, 56, 58, 60, 62, 64) for VCT position (one for each cylinder). However, as will be discussed in greater detail below, by varying the width of each VCT tab (54, 56, 58, 60, 62, 64), CID information may also be uniquely encoded. This encoded sensor wheel (50) is installed in a specified orientation relative to the engine cycle so that VCT tabs (54, 56, 58, 60, 62, 64) can be used to uniquely identify camshaft position.

A pickup sensor (66) and a circuit/microprocessor (68) produce a unique signal pulse for each VCT tab (54, 56, 58, 60, 62, 64). In that regard, sensor wheel (50) and pickup sensor (66) act as a signal generator for generating a plurality of signal pulses, wherein each signal pulse has a unique length and is associated with one of a plurality of engine cylinders. It should be noted that sensor pickup (66) is preferably a variable reluctance sensor well known in the art, although other sensors may also be used, such as a Hall effect sensor.

Figure 2B:
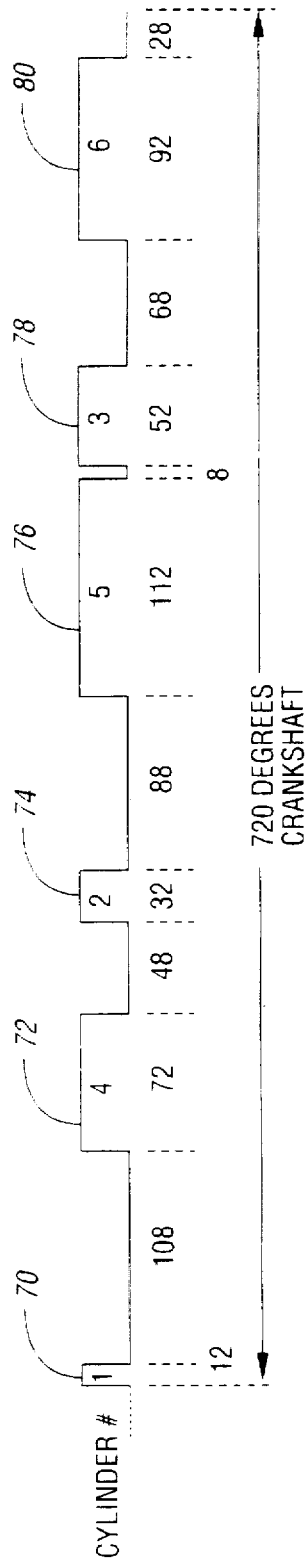
FIG. 2b is a graphical representation of a VCT/CID signal pulse train produced by the sensor wheel of FIG. 2a according to the method and system of the present invention.

Referring next to FIG. 2b, a graphical representation is shown of a signal pulse train produced by sensor wheel (50). As seen therein, due to the configuration of sensor wheel (50), a leading edge of a VCT signal pulse (70, 72, 74, 76, 78, 80) is produced over time for every 120 degrees of crankshaft rotation (60 degrees of camshaft rotation) (i.e., 6-cylinder engine). Also due to the configuration of sensor wheel (50), the length of and spacing between each VCT signal pulse (70, 72, 74, 76, 78, 80) is unique, and each VCT signal pulse (70, 72, 74, 76, 78, 80) is associated with one of the six engine cylinders, as shown therein.

In the preferred embodiment of the present invention, the lengths/spacing of VCT signal pulses (70, 72, 74, 76, 78, 80) are as shown in FIG. 2b (in crank angle degrees). However, as those of ordinary skill in the art will recognize, other configurations of sensor wheel (50) producing other lengths/spacing of VCT signal pulses (70, 72, 74, 76, 78, 80) may be used, provided the length of each VCT signal pulse (70, 72, 74, 76, 78, 80) remains unique and within the resolution of the measurement system provided. Indeed, as will be described in greater detail below, it is the unique length of each VCT signal pulse (70, 72, 74, 76, 78, 80) which is used for early CID.

In that regard, many microprocessor-based engine control systems use a crankshaft angle degree domain clock to accurately schedule fuel and spark events during the engine cycle. In the method and system of the present invention, such a crank angle degree clock (not specifically shown) is used to measure the width (in crank angle degrees) of each VCT tab (54, 56, 58, 60, 62, 64), and thus to decode the CID information of sensor wheel (50).

In such a fashion, the method and system of the present invention provide for identification of the active cylinder after the leading and trailing edges of any VCT tab (54, 56, 58, 60, 62, 64) have been observed. Thus, cylinder identification is guaranteed to occur within 720/(number_of_ VCT_tabs * 2) crankshaft degrees of observable camshaft sensor wheel rotation. As those of ordinary skill in the art will appreciate, higher resolution crank angle degree clocks will allow more VCT position tabs to be encoded on the camshaft sensor wheel, thus reducing the worst case CID window.

It should be noted that the method and system of the present invention do not interfere with conventional methods for measuring camshaft phasing relative to the crankshaft. In that regard, the crank angle degree (or time) clock is captured at each regularly spaced leading VCT tab edge and compared to the crank angle degree (or time) clock value captured at the last once-per-cylinder crankshaft position event.

Referring next to FIGS. 3 and 4, early CID according to the method and system of the present invention will now be described as applied to a six cylinder VCT engine with crankshaft position measurement events at 10 crankshaft degree resolution, the resolution available from a 36 tab crankshaft sensor wheel. With a camshaft sensor wheel designed as in FIG. 2a, a simple 10 crankshaft degree event counter can be used to identify the current cylinder.

Figure 3B:
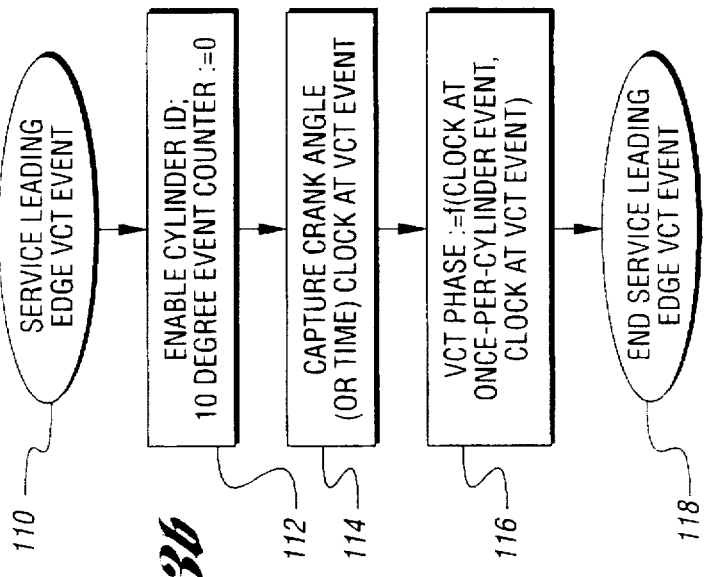
FIG. 3b is a flowchart depicting another portion of the method of the present invention concerning signal pulse leading edge detection.
Figure 3A:
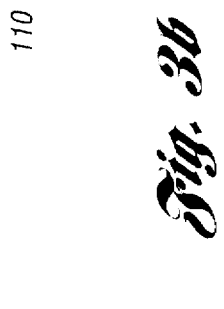
FIG. 3a is a flowchart depicting a portion of the method of the present invention concerning an event counter.
Figure 3A:
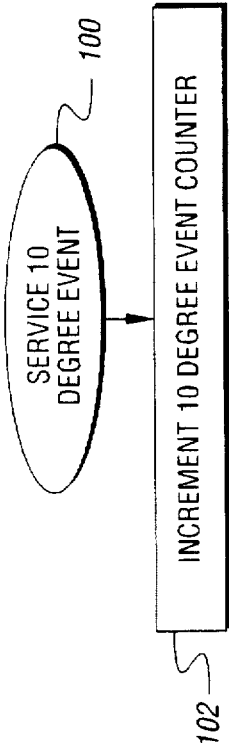
Figure 3A:
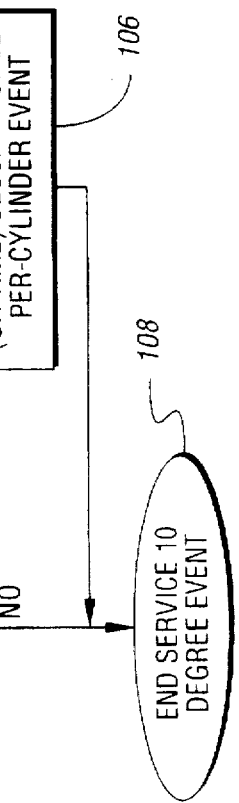
Figure 1:
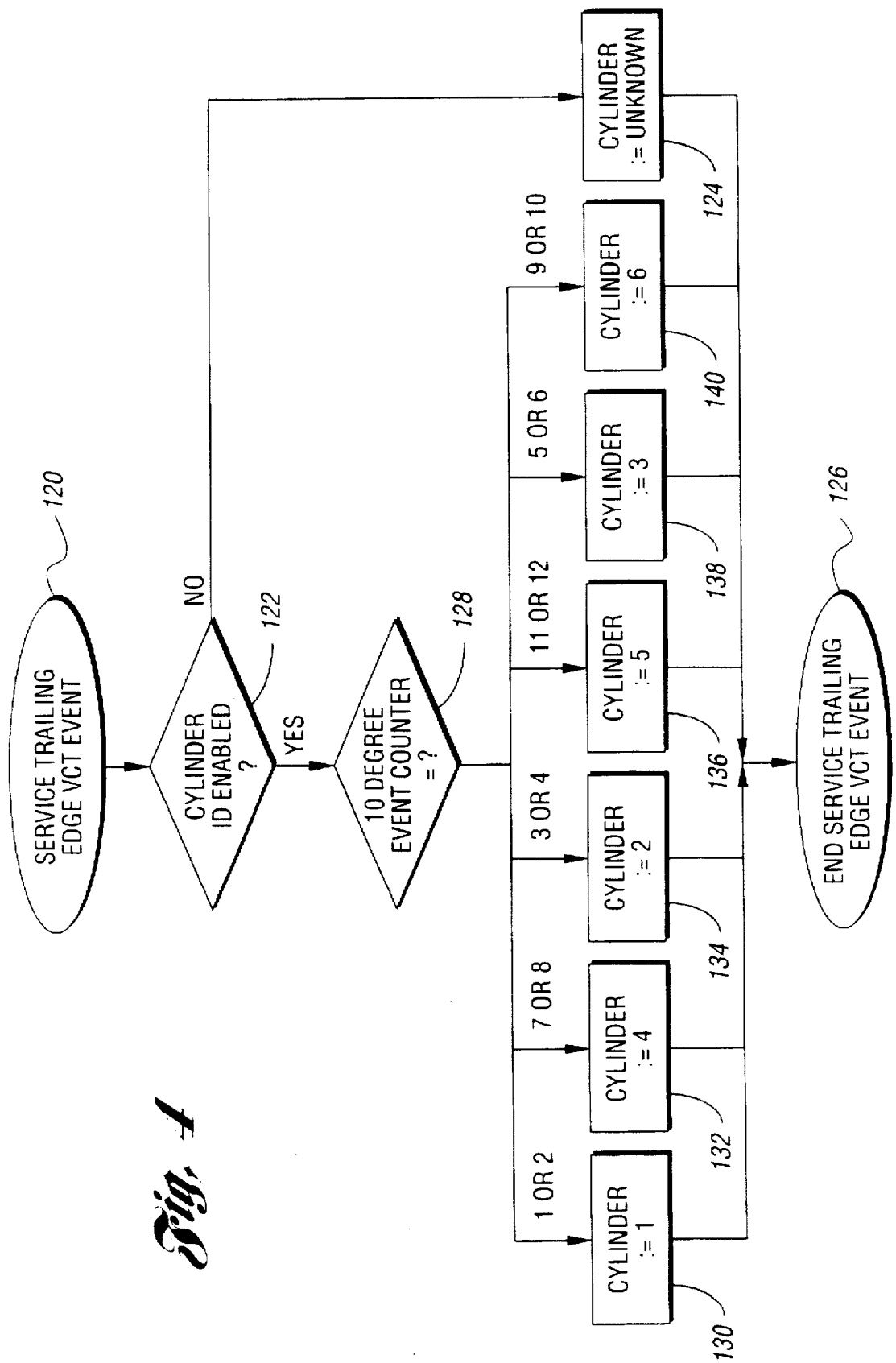

In that regard, FIG. 3a is a flowchart depicting a portion of the method of the present invention concerning an event counter. As seen therein, a "service 10 degree event" algorithm begins (100) with the 10 degree event counter described above being incremented (102) after every 10 degrees of crankshaft rotation. Thereafter, it is determined (104) whether it is time to generate the at least once-per-cylinder crankshaft event for the purposes of relative camshaft phasing. If so, the crank angle (or time) clock is captured (106) at the generation of the at least once-per-cylinder crankshaft event. After such capture (106) of the crank angle (or time) clock, or if it is determined (104) that it is not time to generate the at least once-per-cylinder crankshaft event, the "service 10 degree event" algorithm ends (108).

Referring next to FIG. 3b, a flowchart depicting another portion of the method of the present invention concerning signal pulse leading edge detection is illustrated. As seen therein, a "service leading edge VCT event" algorithm begins (110) with CID being enabled and the 10 crankshaft degree event counter being reset (112) upon the detection of a leading edge of a VCT signal pulse. Moreover, the crank angle (or time) clock is captured (114) at the detection of a leading edge of a VCT signal pulse. Such a crank angle (or time) clock, together with the crank angle (or time) clock captured (106) (see FIG. 3a) at the generation of the at least once-per-cylinder crankshaft event, are used for relative camshaft phasing (116). The "service leading edge VCT event" algorithm then ends (118).

Referring finally to FIG. 4, a flowchart depicting another portion of the method of the present invention concerning signal pulse trailing edge detection and CID is shown. As seen therein, a "service trailing edge VCT event" algorithm begins (120) upon detection of a trailing edge of a VCT signal pulse. Thereafter, it is determined (122) whether or not CID has been enabled. If not, the cylinder identity is determined (124) as unknown, and the "service trailing edge VCT event" algorithm ends (126). However, if it is determined (122) that CID has been enabled, then the value of the 10 degree event counter is determined (128) at the detection of a trailing edge of a VCT signal pulse.

With reference now to FIGS. 2b and 4, the VCT signal pulse (70) associated with the first cylinder of a 6-cylinder engine has a length of 12 crankshaft degrees. Given its initialization upon detection of the leading edge of that VCT signal pulse (70), the 10 crankshaft degree event counter will only be incremented once or twice (depending on relative camshaft phasing) before detection of the trailing edge of that VCT signal pulse (70). Therefore, at the time for CID, the value of the 10 crankshaft degree event counter will be 1 or 2, and the engine cylinder will be identified (130) as the first.

Similarly, the VCT signal pulse (72) associated with the fourth cylinder of a 6-cylinder engine has a length of 72 crankshaft degrees. Given its initialization upon detection of the leading edge of that VCT signal pulse (72), the 10 crankshaft degree event counter will be incremented seven or eight times (depending on relative camshaft phasing) before detection of the trailing edge of that VCT signal pulse (72). Therefore, at the time for CID, the value of the 10 crankshaft degree event counter will be 7 or 8, and the engine cylinder will be identified (132) as the fourth.

Those of ordinary skill in the art will appreciate that the remaining cylinders are identified (134, 136, 138, 140) in a similar fashion. After identification (130, 132, 134, 136, 138, 140) of a particular engine cylinder, the "service trailing edge VCT event" algorithm ends (126).

It should be noted that the algorithms depicted in FIGS. 3 and 4 are preferably performed by circuit/microprocessor (68) once appropriately programmed. However, those of ordinary skill in the art will recognize that these algorithms may also be performed by any equivalent thereof, such as specific electronic hardware. Those of ordinary skill in the art will further recognize that the various aspects of the algorithms depicted in FIGS. 3 and 4 may be undertaken in any sequence and/or simultaneously.

It should also be noted that circuit/microprocessor (68) (or any equivalent thereof) acts as a measurement system for measuring the length of one of a plurality of signal pulses, as well as a cylinder identifier for identifying the engine cylinder associated with the signal pulse based on the measured length of the signal pulses. In that regard, the measurement system and cylinder identifier include control logic operative to identify a crank angle reference point when the leading edge of the one of the plurality of signal pulses is detected and to determine a relative crank angle based on the crank angle reference point when the trailing edge of the one of the plurality of signal pulses is detected. Where such control logic operative to identify the crank angle reference point and the relative crank angle based thereon includes a counter, the control logic is further operative to initialize a value of the counter when the leading edge of the one of the plurality of signal pulses is detected, to increment the value of the counter at regular crank angle intervals, and to determine the value of the counter when the trailing edge of the one of the plurality of signal pulses is detected.

Such control logic is further operative to compare the relative crank angle based on the crank angle reference point to at least one of a plurality of cylinder identification values, wherein each value is associated with one of the plurality of engine cylinders, and to identify the one of the plurality of engine cylinders based on which of the plurality of cylinder identification values correspond to the relative crank angle. Still further, such control logic is also operative to compare the value of the counter determined when the trailing edge of the one of the plurality of signal pulses is detected to at least one of a plurality of cylinder identification values, wherein each value is associated with one of the plurality of engine cylinders, and to identify the one of the plurality of engine cylinders based-on which of the plurality of cylinder identification values matches the value of the counter.

As is readily apparent from the foregoing description, then, the present invention provides an improved method and system for early cylinder identification. More specifically, the present invention provides a method and system that identify camshaft position (i.e., active cylinder) during engine crank using pulsewidth encoding. In that fashion, the method and system of the present invention reduce the expenses associated with prior art early CID methods and systems and require fewer degrees of camshaft rotation for active CID. Still further, the method and system of the present invention are also compatible with both fixed and variable camshaft timing (VCT) systems.

It is to be understood that the present invention has been described herein in an illustrative manner and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described herein.

What is claimed is:

1. A method for early identification of a plurality of cylinders in a variable camshaft timing equipped vehicle engine, the method comprising:

generating a plurality of signal pulses, wherein each signal pulse has a unique length and is associated with one of the plurality of engine cylinders, the plurality of signal pulses being divided into a set of even numbered pulses and a set of odd numbered pulses;

measuring the length of each of the plurality of signal pulses, wherein the measured length of each even numbered pulse is greater than a first predetermined length and the measured length of each odd numbered pulse is less than a second predetermined length; and identifying each one of the plurality of engine cylinders based on the measured length of the one of the plurality of signal pulses associated therewith.

2. The method of claim 1 wherein generating a plurality of signal pulses comprises:

providing a camshaft wheel having a plurality of tabs, wherein each tab has a unique width and is associated with one of the plurality of engine cylinders;

rotating the camshaft wheel; and sensing passage of each of the plurality of tabs as the camshaft wheel rotates.

3. The method of claim 1 wherein measuring the length of one of the plurality of signal pulses comprises:

detecting a leading edge of the one of the plurality of signal pulses;

identifying a crank angle reference point when the leading edge of the one of the plurality of signal pulses is detected;

detecting a trailing edge of the one of the plurality of signal pulses; and determining a relative crank angle based on the crank angle reference point when the trailing edge of the one of the plurality of signal pulses is detected.

4. The method of claim 3 wherein the crank angle reference point is used for relative phasing of a camshaft and a crankshaft.

5. The method of claim 3 wherein identifying a crank angle reference point when the leading edge of the one of the plurality of signal pulses is detected comprises:

providing a counter; and initializing a value of the counter when the leading edge of the one of the plurality of signal pulses is detected.

6. The method of claim 5 wherein determining a relative crank angle when the trailing edge of the one of the plurality of signal pulses is detected comprises:

incrementing the value of the counter at regular crank angle intervals; and determining the value of the counter when the trailing edge of the one of the plurality of signal pulses is detected.

7. The method of claim 3 wherein identifying the one of the plurality of engine cylinders associated with the one of the plurality of signal pulses based on the measured length of the one of the plurality of signal pulses comprises:

comparing the relative crank angle determined to at least one of a plurality of cylinder identification values, wherein each value is associated with one of the plurality of engine cylinders; and identifying the one of the plurality of engine cylinders based on which of the plurality of cylinder identification values corresponds to the relative crank angle.

8. The method of claim 6 wherein identifying the one of the plurality of engine cylinders associated with the one of the plurality of signal pulses based on the measured length of the one of the plurality of signal pulses comprises:

comparing the value of the counter determined when the trailing edge of the one of the plurality of signal pulses is detected to at least one of a plurality of cylinder identification values, wherein each value is associated with one of the plurality of engine cylinders; and identifying the one of the plurality of engine cylinders based on which of the plurality of cylinder identification values matches the value of the counter.

9. A system for early identification of a plurality of cylinders in a variable camshaft timing equipped vehicle engine, the system comprising:

a signal generator for generating a plurality of signal pulses, wherein each signal pulse has a unique length and is associated with one of the plurality of engine cylinders, the plurality of signal pulses being divided into a set of even numbered pulses and a set of odd numbered pulses;

a measurement system for measuring the length of each of the plurality of signal pulses wherein the measured length of each even numbered pulse is greater than a first predetermined length and the measured length of each odd numbered pulse is less than a second predetermined length; and a cylinder identifier for identifying each one of the plurality of engine cylinders based on the measured length of the one of the plurality of signal pulses associated therewith.

10. The system of claim 9 wherein the signal generator comprises:

a camshaft wheel having a plurality of tabs, wherein each tab has a unique width and is associated with one of the plurality of engine cylinders;

means for rotating the camshaft wheel; and a sensor for sensing passage of each of the plurality of tabs as the camshaft wheel rotates.

11. The system of claim 9 wherein the measurement system comprises:

a sensor for detecting a leading edge of the one of the plurality of signal pulses;

a sensor for detecting a trailing edge of the one of the plurality of signal pulses; and control logic operative to identify a crank angle reference point when the leading edge of the one of the plurality of signal pulses is detected and to determine a relative crank angle based on the crank angle reference point when the trailing edge of the one of the plurality of signal pulses is detected.

12. The system of claim 11 wherein the crank angle reference point is used for relative phasing of a camshaft and a crankshaft.

13. The system of claim 11 wherein the control logic operative to identify a crank angle reference point when the leading edge of the one of the plurality of signal pulses is detected includes a counter, and the control logic is further operative to initialize a value of the counter when the leading edge of the one of the plurality of signal pulses is detected.

14. The system of claim 13 wherein the control logic operative to determine a relative crank angle based on the crank angle reference point when the trailing edge of the one of the plurality of signal pulses is detected is further operative to increment the value of the counter at regular crank angle intervals, and to determine the value of the counter when the trailing edge of the one of the plurality of signal pulses is detected.

15. The system of claim 11 wherein the cylinder identifier comprises control logic operative to compare the relative crank angle to at least one of a plurality of cylinder identification values, wherein each value is associated with one of the plurality of engine cylinders, and to identify the one of the plurality of engine cylinders based on which of the plurality of cylinder identification values corresponds to the relative crank angle.

16. The system of claim 14 wherein the cylinder identifier comprises control logic operative to compare the value of the counter determined when the trailing edge of the one of the plurality of signal pulses is detected to at least one of a plurality of cylinder identification values, wherein each value is associated with one of the plurality of engine cylinders, and to identify the one of the plurality of engine cylinders based on which of the plurality of cylinder identification values matches the value of the counter.

* * * * *